US012208565B2

(12) United States Patent
Kikuchi et al.

(10) Patent No.: US 12,208,565 B2
(45) Date of Patent: Jan. 28, 2025

(54) MASTER, TRANSFERRED OBJECT, AND METHOD OF PRODUCING MASTER

(71) Applicant: DEXERIALS CORPORATION, Tokyo (JP)

(72) Inventors: Masanao Kikuchi, Tokyo (JP); Hiroshi Tazawa, Tokyo (JP); Asahiko Nogami, Tokyo (JP); Kazuya Hayashibe, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 380 days.

(21) Appl. No.: 16/955,628

(22) PCT Filed: Dec. 18, 2018

(86) PCT No.: PCT/JP2018/046607
§ 371 (c)(1),
(2) Date: Jun. 18, 2020

(87) PCT Pub. No.: WO2019/131339
PCT Pub. Date: Jul. 4, 2019

(65) Prior Publication Data
US 2021/0053273 A1 Feb. 25, 2021

(30) Foreign Application Priority Data
Dec. 26, 2017 (JP) .................................. 2017-249060

(51) Int. Cl.
*B29C 59/04* (2006.01)
*B29C 33/38* (2006.01)
*C23F 1/02* (2006.01)

(52) U.S. Cl.
CPC .......... *B29C 59/04* (2013.01); *B29C 33/3842* (2013.01); *C23F 1/02* (2013.01)

(58) Field of Classification Search
CPC .......... G02B 1/118; G02B 5/0215; G02B 3/08
See application file for complete search history.

(56) References Cited

U.S. PATENT DOCUMENTS 9,765,941 B2 9/2017 Okuno
2006/0227834 A1* 10/2006 Yoshikawa .............. G02B 1/12
372/50.11

(Continued)

FOREIGN PATENT DOCUMENTS

CA 2233556 A * 9/1998 ........... B29C 33/306
CN 106597756 A 4/2017

(Continued)

OTHER PUBLICATIONS

Espacenet Translation of JP-2016190418-A (Year: 2023).*

(Continued)

*Primary Examiner* — Michael Zhang
(74) *Attorney, Agent, or Firm* — Paratus Law Group, PLLC

(57) ABSTRACT

Provided are a master in which a more complicated microstructure is formed, a transferred object obtained by using the master, and a method of producing the master. A plurality of concave-convex groups each including a plurality of concavities or convexities are provided on a base material apart from each other. Average widths of areas occupied by the concavities or convexities at a surface of the base material are smaller than or equal to a wavelength belonging to a visible light band. Formed lengths of the concavities or convexities from the surface of the base material in each of the concave-convex groups each belong to any of at least two or more groups having different central values.

14 Claims, 14 Drawing Sheets

(56) References Cited

U.S. PATENT DOCUMENTS

| | | | | |
|---|---|---|---|---|
| 2011/0068249 | A1* | 3/2011 | Pan | B29C 33/424 |
| | | | | 249/114.1 |
| 2011/0096403 | A1* | 4/2011 | Cheng | G02B 1/118 |
| | | | | 359/601 |
| 2011/0102900 | A1* | 5/2011 | Hayashibe | G02B 5/045 |
| | | | | 359/601 |
| 2012/0140301 | A1* | 6/2012 | Xu | G02B 23/243 |
| | | | | 359/198.1 |
| 2013/0050834 | A1* | 2/2013 | Fujikawa | G02B 27/0101 |
| | | | | 359/630 |
| 2013/0063754 | A1* | 3/2013 | Saisho | G02B 27/0101 |
| | | | | 358/1.13 |
| 2013/0242567 | A1* | 9/2013 | Ariyoshi | F21K 9/60 |
| | | | | 362/337 |
| 2015/0362634 | A1* | 12/2015 | Iwase | G02B 1/118 |
| | | | | 359/601 |
| 2018/0015641 | A1* | 1/2018 | Kajiya | B29C 33/38 |
| 2018/0224578 | A1* | 8/2018 | Kajiya | G02B 1/118 |
| 2020/0198187 | A1* | 6/2020 | Muramoto | B29C 33/424 |

FOREIGN PATENT DOCUMENTS

| | | | | |
|---|---|---|---|---|
| CN | 111527421 | A | 8/2020 | |
| JP | 2003240904 | A * | 8/2003 | B29C 59/02 |
| JP | 2007-057622 | A | 3/2007 | |
| JP | 3894966 | B2 * | 3/2007 | B29C 33/306 |
| JP | 2007-331111 | A | 12/2007 | |
| JP | 2011-051285 | A | 3/2011 | |
| JP | 2012-187762 | A | 10/2012 | |
| JP | 2012-218218 | A | 11/2012 | |
| JP | 2014-209231 | A | 11/2014 | |
| JP | 2016190418 | A * | 11/2016 | B29C 33/38 |
| JP | 2017-129889 | A | 7/2017 | |
| TW | 201505812 | A | 2/2015 | |
| WO | WO 2014/162374 | A1 | 10/2014 | |
| WO | WO 2015/156214 | A1 | 10/2015 | |
| WO | WO 2016/158933 | A1 | 10/2016 | |

OTHER PUBLICATIONS

Dec. 12, 2022, Combined Taiwanese Office Action and Search Report issued for related TW Application No. 107146630.
Dec. 22, 2021, Chinese Office Action issued for related CN Application No. 201880083365.1.
Nov. 8, 2022, Japanese Office Action issued for related JP Application No. 2022-063718.
Sep. 28, 2021, Japanese Office Action issued for related JP application No. 2017-249060.
Sep. 23, 2021, European Search Report issued for related EP application No. 18897583.3.
Dec. 19, 2023, Japanese Office Action issued for related JP Application No. 2023-060969.
Jul. 31, 2024, Korean Office Action issued for related KR Application No. 10-2020-7018725.
Oct. 4, 2024, European Communication issued for related EP Application No. 18897583.3.
Jul. 22, 2024, Combined Taiwanese Office Action and Search Report issued for related TW Application No. 112136781.

* cited by examiner

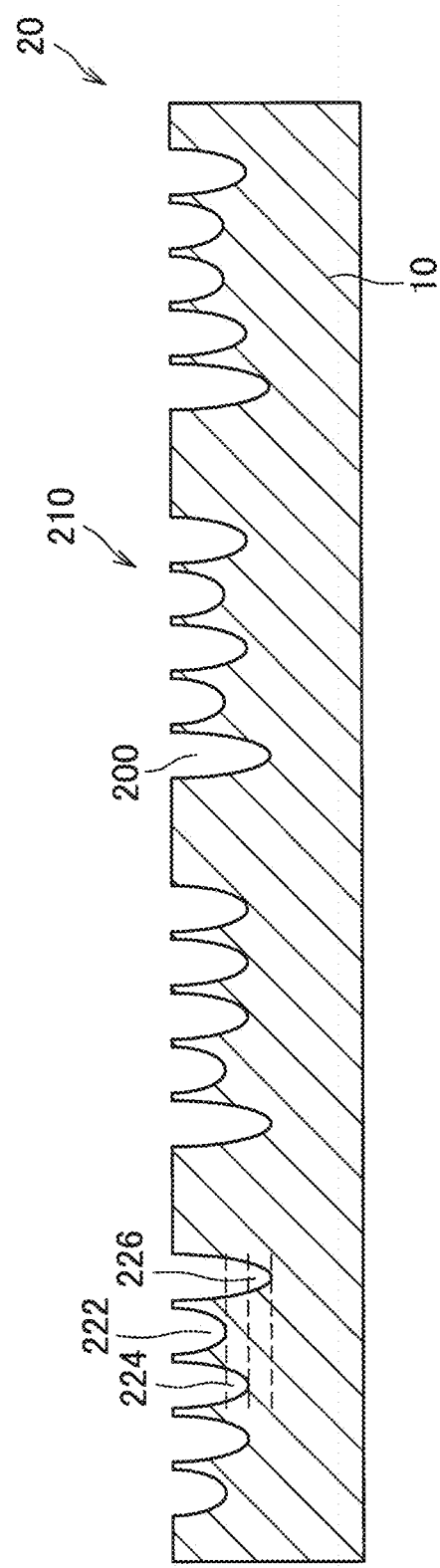

MASTER, TRANSFERRED OBJECT, AND METHOD OF PRODUCING MASTER

CROSS REFERENCE TO PRIOR APPLICATION

This application is a National Stage Patent Application of PCT International Patent Application No. PCT/JP2018/046607 (filed on Dec. 18, 2018) under 35 U.S.C. § 371, which claims priority to Japanese Patent Application No. 2017-249060 (filed on Dec. 26, 2017), which are all hereby incorporated by reference in their entirety.

TECHNICAL FIELD

The present invention relates to a master, a transferred object, and a method of producing the master.

BACKGROUND ART

In recent years, development of an imprinting technology as one of micromachining technologies has been advanced. The imprinting technology is a technology of pressing a master having a minute concave-convex structure formed on the surface against a resin sheet or the like to transfer the concave-convex structure on the master surface to the resin sheet.

The concave-convex structure of the master used for the imprinting technology can be formed by using a micromachining technology which will be described below.

For example, in a case of forming a concave-convex structure in a master having a planar shape, a concave-convex structure corresponding to an interference pattern of laser light can be formed in one main surface of the master by using a laser interference exposure method as described in Patent Literature 1 below.

In addition, in a case of producing a concave-convex structure in a master having a columnar shape, a concave-convex structure can be formed in the outer peripheral surface of the master having a columnar shape by using a lithography technology by means of laser light, for example. Specifically, the concave-convex structure can be formed continuously in the outer peripheral surface by rotating a base material having a columnar shape around a rotation axis passing through the center of the bottom surface and upper surface, and then emitting laser light to the outer peripheral surface of the base material while scanning the base material with the laser light in the axial direction.

CITATION LIST

Patent Literature

Patent Literature 1: JP 2007-57622A

SUMMARY OF INVENTION

Technical Problem

However, in the above-described method of forming a concave-convex structure, merely a particular concave-convex structure associated with the forming method can be formed, and it is difficult to form an arbitrary concave-convex structure. In particular, it is difficult to form such a complicated concave-convex structure in which a plurality of concave-convex groups are further laid out, the concave-convex groups each including a plurality of concavities or convexities. Therefore, a pattern forming method in which a more complicated concave-convex structure can be freely formed, and a master formed by the pattern forming method have been demanded.

The present invention was therefore made in view of the above-described problems, and an object of the present invention is to provide a master in which a more complicated concave-convex structure is formed, a transferred object obtained by using the master, and a method of producing the master.

Solution to Problem

In order to solve the above-described problems, according to an aspect of the present invention, there is provided a master including a plurality of concave-convex groups provided on a base material apart from each other, the concave-convex groups each including a plurality of concavities or convexities, in which average widths of areas occupied by the concavities or convexities at a surface of the base material are smaller than or equal to a wavelength belonging to a visible light band, and formed lengths of the concavities or convexities from the surface of the base material in each of the concave-convex groups each belong to any of at least two or more groups having different central values.

The average widths of the areas occupied by the respective concavities or convexities at the surface of the base material in each of the concave-convex groups may belong to any of at least two or more groups having different central values.

The average widths of the areas occupied by the concavities or convexities at the surface of the base material may increase as the formed lengths of the concavities or convexities at the surface of the base material increase.

The areas occupied by the respective concavities or convexities at the surface of the base material may have a generally circular planar shape.

An interval at which each of the concave-convex groups is provided may be larger than the wavelength belonging to a visible light band.

The respective concavities or convexities in each of the concave-convex groups may be provided in a closest-packed arrangement.

The formed lengths of the respective concavities or convexities from the surface of the base material may be changed gradually within each of the concave-convex groups.

The formed lengths of the respective concavities or convexities from the surface of the base material may be changed irregularly within each of the concave-convex groups.

The respective concave-convex groups may be laid out regularly.

The respective concave-convex groups may be laid out irregularly.

In addition, in order to solve the above-described problems, according to another aspect of the present invention, there is provided a transferred object in which a concave-convex structure including a plurality of the concave-convex groups provided in the above-described master has been transferred.

In addition, in order to solve the above-described problems, according to another aspect of the present invention, there is provided a method of producing a master, including the steps of forming a resist layer on a surface of a base material, emitting laser light to the resist layer from a laser light source while arbitrarily controlling an output intensity and emission timing of the laser light source, removing the resist layer in a region to which the laser light has been emitted or the laser light has not been emitted to form a pattern on the resist layer, the pattern including a plurality of concave-convex groups each including a plurality of concavities or convexities, and performing etching using the resist layer on which the pattern has been formed as a mask to form a concave-convex structure corresponding to the pattern in the surface of the base material.

The base material may have a columnar or cylindrical shape, and while rotating the base material with a height direction of the columnar or cylindrical shape serving as a rotation axis, the laser light source may move relatively in parallel to the rotation axis to emit the laser light to the resist layer on the base material.

A control signal for the laser light source may be generated to be synchronized with a control signal for rotation of the base material.

The laser light source may be a semiconductor laser light source.

Since the above configuration enables output of laser light for forming the concave-convex structure in the master to be arbitrarily controlled, the arrangement and formed lengths of the concavities or convexities can be controlled with higher accuracy and higher reproducibility.

Advantageous Effects of Invention

According to the present invention as described above, a master in which a more complicated concave-convex structure is formed, a transferred object obtained by using the master, and a method of producing the master can be provided.

BRIEF DESCRIPTION OF DRAWINGS

FIG. 2A is a cross-sectional view showing an example of a concave-convex structure formed in the outer peripheral surface of the master.

DESCRIPTION OF EMBODIMENTS

Figure 1:
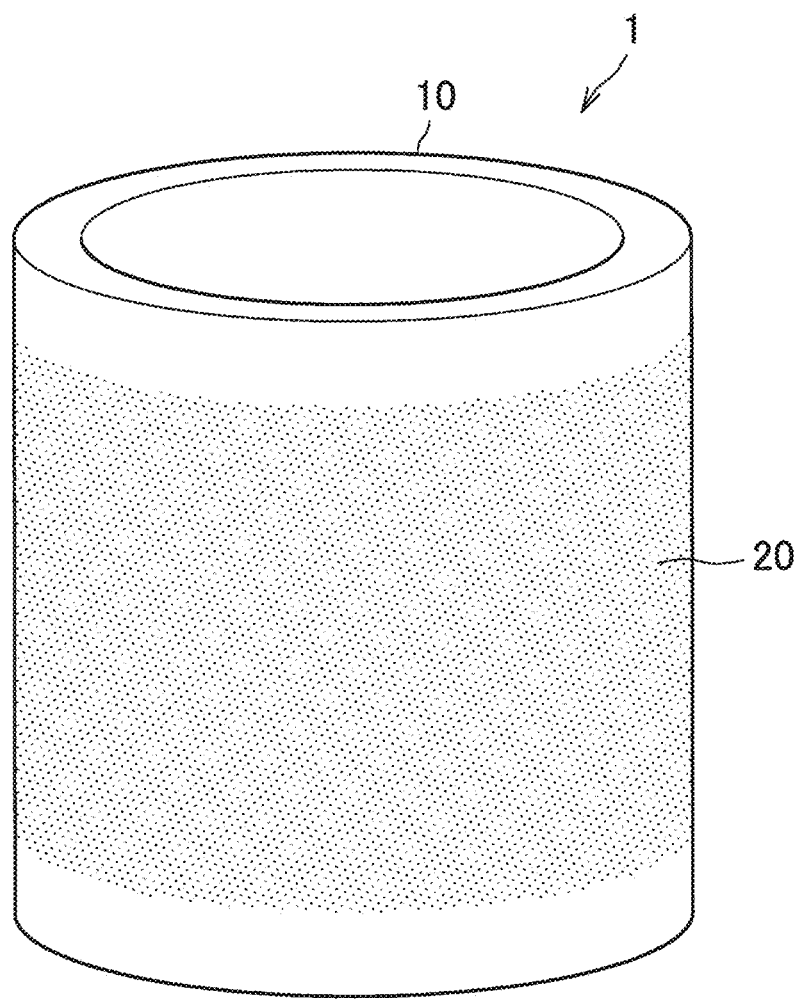
FIG. 1 is a perspective view schematically showing an appearance of a master according to an embodiment of the present invention.

Hereinafter, (a) preferred embodiment(s) of the present invention will be described in detail with reference to the appended drawings. Note that, in the present specification and the drawings, structural elements that have substantially the same function and structure are denoted with the same reference numerals, and repeated explanation is omitted.

<1. Appearance of Master>

First, an appearance of a master according to an embodiment of the present invention will be described with reference to FIG. 1. FIG. 1 is a perspective view schematically showing the appearance of the master according to the present embodiment.

As shown in FIG. 1, a master 1 according to the present embodiment includes, for example, a base material 10 having a concave-convex structure 20 formed in the outer peripheral surface.

The master 1 is a master to be used for a roll-to-roll imprinting technology, for example. The roll-to-roll imprinting technology enables the concave-convex structure formed in the outer peripheral surface to be transferred to a sheet-like base material or the like by pressing the outer peripheral surface of the master 1 against the sheet-like base material or the like while rotating the master 1. With such an imprinting technology, a transferred object obtained by transferring the concave-convex structure 20 formed in the outer peripheral surface can be produced efficiently with the master 1.

Note that the transferred object obtained by transferring the concave-convex structure 20 can be used for various applications. The transferred object obtained by transferring the concave-convex structure 20 can be used as an optical member for a light guide panel, a light diffuser panel, a microlens array, a Fresnel lens array, a diffraction grating, an anti-reflection film, or the like, for example.

The base material 10 is a member having a cylindrical shape or columnar shape, for example. The base material 10 may have a hollow cylindrical shape with a cavity therein as shown in FIG. 1, or may have a solid columnar shape with no cavity therein. The base material 10 may be made of a glass material consisting primarily of $SiO_2$, such as fused quartz glass or synthetic quartz glass, or may be made of metal such as stainless steel, for example. In addition, the outer peripheral surface of the base material 10 may be covered by $SiO_2$ or the like.

The base material 10 is preferably made of a glass material consisting primarily of $SiO_2$ at least on the outer peripheral surface, and more preferably made of a glass material consisting primarily of $SiO_2$ as a whole. This is because, in a case where the base material 10 consists primarily of $SiO_2$, the base material 10 can be processed easily by etching through use of a fluorine compound. The concave-convex structure 20 can be formed in the outer peripheral surface of the base material 10 by, for example, performing etching through use of a fluorine compound using a resist layer in which a pattern corresponding to the concave-convex structure 20 is formed as a mask.

Note that, in a case where the base material 10 has a columnar shape, the columnar shape of the base material 10 may have a height (length in the axial direction) of more than or equal to 100 mm, and the circle of the bottom surface or upper surface of the columnar shape may have a diameter (outer diameter in the radial direction orthogonal to the axial direction) of more than or equal to 50 mm and less than or equal to 300 mm, for example. Alternatively, in a case where the base material 10 has a cylindrical shape, the outer peripheral surface of the cylinder may have a thickness of more than or equal to 2 mm and less than or equal to 50 mm. However, the size of the base material 10 is not limited to the foregoing.

The concave-convex structure 20 is a structure formed in the outer peripheral surface of the base material 10, and obtained by laying out concavities or convexities regularly or irregularly. Specifically, the concave-convex structure 20 may be a structure obtained by laying out a plurality of concavity groups each including a plurality of concavities. The concavities are provided such that the sizes of and an average of intervals between openings are smaller than or equal to a wavelength belonging to a visible light band, and the concavity groups are provided apart from each other at an interval larger than the wavelength belonging to the visible light band. Note that a concavity represents a concave shape recessed in a direction generally vertical to the outer peripheral surface of the base material 10.

Hereinafter, a description will be given using a case in which the concave-convex structure 20 is a structure obtained by laying out a plurality of concavity groups each including a plurality of concavities as an example. However, in the master 1 according to the present embodiment, the concave-convex structure 20 may obviously be a structure obtained by laying out a plurality of convexity groups each including a plurality of convexities.

<2. Configuration of Master>

Figure 2B:
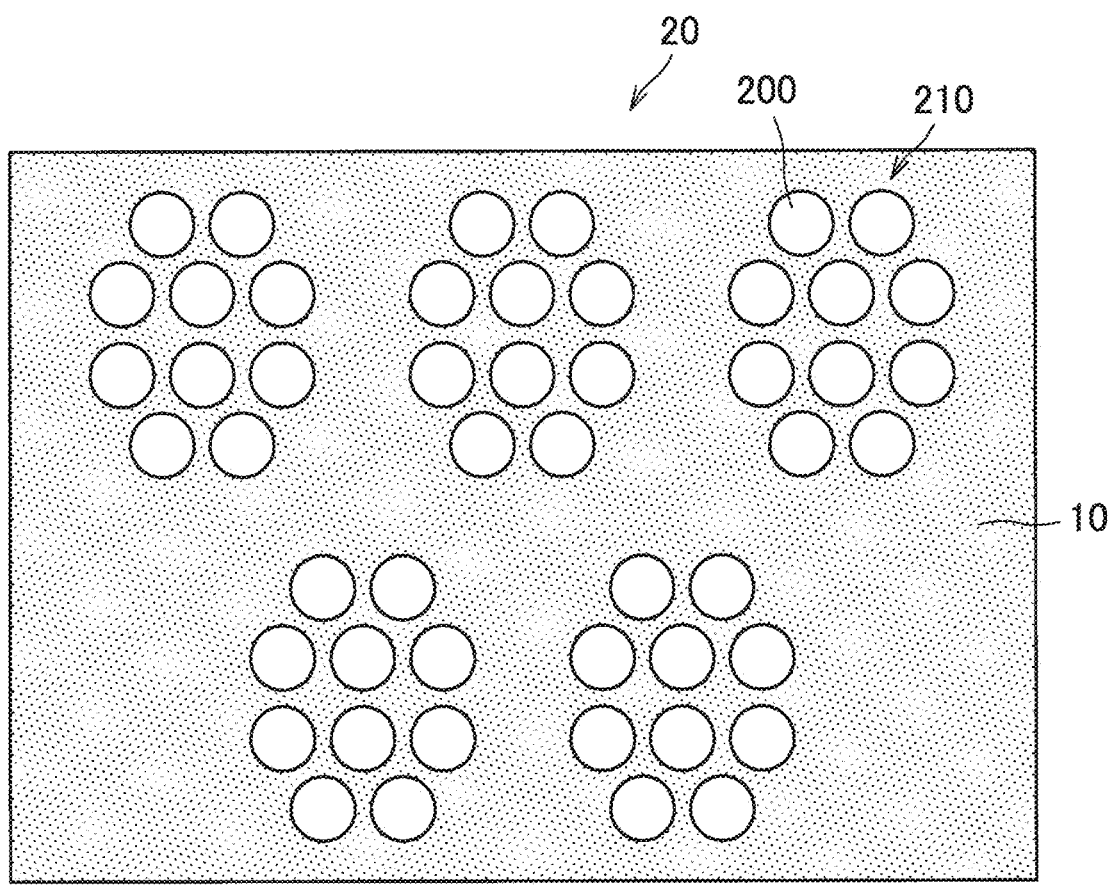
FIG. 2B is a plan view showing an example of the concave-convex structure formed in the outer peripheral surface of the master.

Next, a more specific configuration of the concave-convex structure 20 formed in the outer peripheral surface of the master 1 according to the present embodiment will be described with reference to FIG. 2A and FIG. 2B. FIG. 2A is a cross-sectional view showing an example of the concave-convex structure 20 formed in the outer peripheral surface of the master 1, and FIG. 2B is a plan view showing an example of the concave-convex structure 20 formed in the outer peripheral surface of the master 1. FIG. 2A shows a cross-sectional view cut in the direction vertical to the outer peripheral surface of the master 1, and FIG. 2B shows a plan view as seen in the direction vertical to the outer peripheral surface of the master 1.

As shown in FIG. 2A and FIG. 2B, the concave-convex structure 20 includes a plurality of concavity groups 210 each including a group of a plurality of concavities 200.

The concavity 200 has a concave shape recessed in the direction generally vertical to one main surface of the base material 10. The depth of each of the concavities 200 is provided to belong to any of at least two or more groups having different central values. For example, as shown in FIG. 2A, the concavities 200 may include a first concavity 222 having the shallowest formed depth, a third concavity 226 having the deepest formed depth, and a second concavity 224 having a formed depth intermediate between those of the first concavity 222 and the third concavity 226. The first concavity 222, the second concavity 224, and the third concavity 226 are provided such that their formed depths have differences larger than or equal to manufacturing variations, and the concavity group 210 may be provided to include a plurality of types of concavities 200 provided at different formed depths. That is, the formed depth of each of the concavities 200 may be controlled to be a desired depth, rather than a random depth. Note that the concavities 200 may obviously be provided at four or more types of formed depths.

Herein, the size of the opening of the concavity 200 may be provided to be larger as the formed depth of the concavity 200 becomes deeper. For example, the first concavity 222, the second concavity 224, and the third concavity 226 may be formed such that the first concavity 222 has an opening of the smallest size, the third concavity 226 has an opening of the largest size, and the second concavity 224 has an opening of a size intermediate between those of the first concavity 222 and the third concavity 226. Since the concavities 200 are formed by etching the base material 10 as will be described later, not only etching in the thickness direction of the base material 10, but also etching in the in-plane direction of the base material 10 easily progresses in the concavity 200 having a deep formed depth. Thus, the formed depth and size of the opening of the concavity 200 vary in conjunction with each other.

Note that at least one or more types of each of the plurality of types of concavities 200 formed at different formed depths (in FIG. 2A, the first concavity 222, the second concavity 224, and the third concavity 226) should only be provided within a single concavity group 210. For example, a single concavity group 210 may be configured to include all of each of the first concavity 222, the second concavity 224, and the third concavity 226. Alternatively, a single concavity group 210 may be configured to include any of the first concavity 222, the second concavity 224, and the third concavity 226. The provided number and arrangement of each of the first concavity 222, the second concavity 224, and the third concavity 226 within the concavity group 210 can be controlled as appropriate on the basis of functions to be achieved by the concavity groups 210 or the concave-convex structure 20.

For example, the concavity group 210 may be configured such that the formed depths of the concavities 200 are changed gradually within the concavity group 210. That is, the concavity group 210 may be provided such that the formed depths of the concavities 200 are changed gradually in a predetermined direction. Specifically, the formed depths of the concavities 200 may be changed to trace an arc in a predetermined direction or to be linear in the concavity groups 210 as a whole.

Alternatively, for example, the concavity group 210 may be configured such that the formed depths of the concavities 200 are changed irregularly (at random). Specifically, the formed depths of the concavities 200 may be changed in such a manner that regularity is not seen in the concavity groups 210 as a whole.

The concavity group 210 may include a group of a plurality of concavities 200, and the respective concavity groups 210 may be spaced apart from each other at an interval larger than the wavelength belonging to the visible light band. For example, as shown in FIG. 2B, the concavity group 210 may be configured by arranging the plurality of concavities 200 each having a generally circular opening so as to achieve a closest-packed arrangement, and the respective concavity groups 210 may be spaced apart from each other at an interval wider than the interval between the respective concavities 200.

The opening shape of the concavity 200 may be generally circular as described above, but may be elliptical, polygonal, or the like, for example. However, in a case where the opening shape of the concavity 200 is generally circular or elliptical, the concavities 200 is easier to form. In addition, the arrangement of the concavities 200 in the concavity group 210 may be the closest-packed arrangement as described above, but may be a rectangular lattice arrangement, hexagonal lattice arrangement, staggered lattice arrangement, or the like. The opening shape of the concavities 200 and the arrangement of the concavities 200 in the concavity group 210 can be controlled as appropriate on the basis of functions to be achieved by the concavity groups 210 or the concave-convex structure 20.

Figure 3:
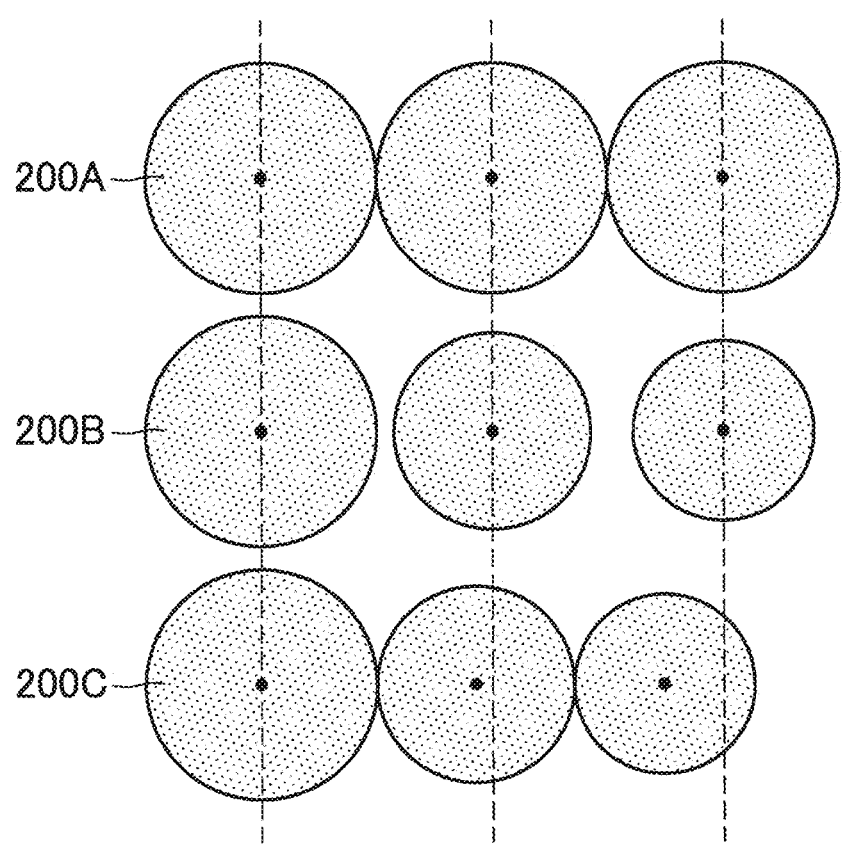
FIG. 3 is a schematic view showing an example of arrangement of concavities in a case where openings have the same size, or in a case where the openings have different sizes.

Herein, the arrangement of the concavities 200 in the concavity group 210 will be described more specifically with reference to FIG. 3. FIG. 3 is a schematic view showing an example of the arrangement of the concavities 200 in a case in which the openings have the same size or different sizes.

As shown in FIG. 3, in a case where the openings of the concavities 200 have a generally constant size (in the case of concavities 200A), for example, the concavities 200A may be provided at the same interval as the size of the openings so as to achieve a closest-packed arrangement. For example, in a case where the openings of the concavities 200 vary in size (in the case of concavities 200B), the concavities 200B may be provided at a constant interval. In such a case, the concavities 200B are easy to form even though the concavities 200B do not achieve a closest-packed arrangement. Alternatively, in a case where the openings of the concavities 200 vary in size (in the case of concavities 200C), the concavities 200C may be provided at an interval controlled in accordance with the size of the opening of each of the concavities 200C. In such a case, the concavities 200C can achieve a closest-packed arrangement even in the case where the openings of the concavities 200 vary in size. According to the present embodiment, the arrangement of the respective concavities 200 and the sizes of the openings can be controlled with high accuracy. Therefore, even in the case where the openings of the concavities 200 vary in size (in the case of the concavities 200C), the concavities 200 can be formed in a closest-packed arrangement.

Each of the concavities 200 may be provided such that the average of the sizes of the openings is smaller than or equal to a wavelength belonging to a visible light band, for example. In addition, similarly, the interval between the respective concavities 200 in the concavity group 210 may be provided to be smaller than or equal to the wavelength belonging to the visible light band. Specifically, the sizes of and the interval between the openings of the concavities 200 may be less than 1 µm, and preferably more than or equal to 100 nm and less than or equal to 350 nm. In the case where the sizes of and the interval between the openings of the concavities 200 fall within the above-described range, the concavity groups 210 and the concave-convex structure 20 can function as what is called a moth-eye structure that restrains reflection of incident light belonging to the visible light band.

In a case where the sizes of and the interval between the openings of the concavities 200 is less than 100 nm, the concavities 200 are difficult to form, which is not preferable. Alternatively, in a case where the sizes of and the interval between the openings of the concavities 200 exceed 350 nm, diffraction of visible light occurs, and the function as a moth-eye structure may degrade, which is not preferable.

The respective concavity groups 210 may be laid out regularly. For example, as shown in FIG. 2B, the respective concavity groups 210 may be concavity groups 210 having identically configured and arranged concavities 200, and the respective concavity groups 210 may be laid out regularly at a predetermined interval. Alternatively, the respective concavity groups 210 may be laid out irregularly. For example, the respective concavity groups 210 may be laid out irregularly at a random-sized interval from each other. The layout of the respective concavity groups 210 can be controlled as appropriate on the basis of the functions to be achieved by the concave-convex structure 20.

As described above, the concavities 200 of the concave-convex structure 20 are formed at a plurality of types of different formed depths. That is, the formed depth of the concavity 200 is provided to belong to any of a plurality of groups having different central values. Therefore, in the concave-convex structure 20, the formed depth of each of the concavities 200 is controlled with high accuracy so as to be a predetermined formed depth for each of the concavities 200. In addition, the concave-convex structure 20 is provided such that the concavity groups 210 each including a plurality of concavities 200 are spaced apart from each other, without the concavities 200 being provided continuously at a predetermined interval. Therefore, in the concave-convex structure 20, the formed positions of the concavities 200 are controlled with high accuracy such that the interval within the concavity group 210 and the interval between the concavity groups 210 are different.

Therefore, since the present embodiment enables the arrangement and formed depths of the concavities 200 to be controlled with higher accuracy and higher reproducibility, the master 1 can include a more complicated concave-convex structure 20.

<3. Specific Examples of Master>

Next, specific examples of the concave-convex structure 20 formed in the outer peripheral surface of the master 1 according to the present embodiment will be described with reference to FIG. 4 to FIG. 8. FIG. 4 to FIG. 8 each include a cross-sectional view and a plan view schematically showing an example of a transferred object obtained by transferring the concave-convex structure 20 provided in the master 1. Thus, the concave-convex structures 20 shown in FIG. 4 to FIG. 8 have concave-convex shapes inverted from the concave-convex shape of the concave-convex structure 20 formed in the master 1. Note that the plan views in FIG. 4 to FIG. 8 illustrate that circles shown in denser dot hatching correspond to higher convexities.

First Specific Example

Figure 4:
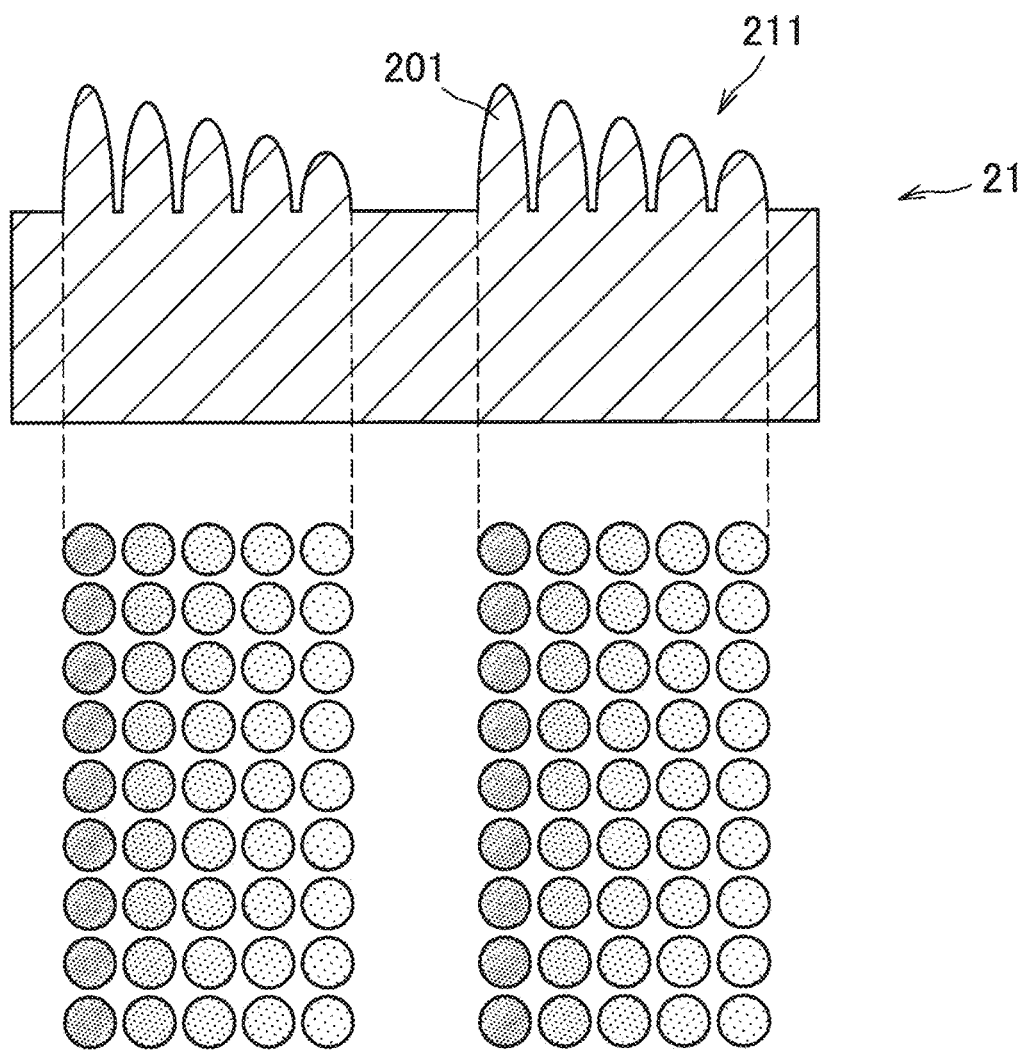
FIG. 4 includes a cross-sectional view and a plan view schematically showing an example of a transferred object obtained by transferring the concave-convex structure provided in the master.

As shown in FIG. 4, a concave-convex structure 21 may be structured such that convexity groups 211 (that is, concavity groups in the master 1), each including convexities 201 (that is, concavities in the master 1) laid out in the form of a rectangular lattice, are provided at a predetermined interval. In the concave-convex structure 21, the convexity groups 211 are provided such that the heights of the convexities 201 in each of the convexity groups 211 increase or decrease gradually in a first direction, and such that in a second direction perpendicular to the first direction, the heights of the convexities 201 are generally equal. Therefore, in the concave-convex structure 21 shown in FIG. 4, the convexity groups 211 may be formed as a structure presenting a triangular wave-like (sawtooth-like) shape as a whole in the first direction. The transferred object including the concave-convex structure 21 can be used as a diffractive element having an anti-reflection function by means of a moth-eye structure, for example.

Second Specific Example

Figure 5:
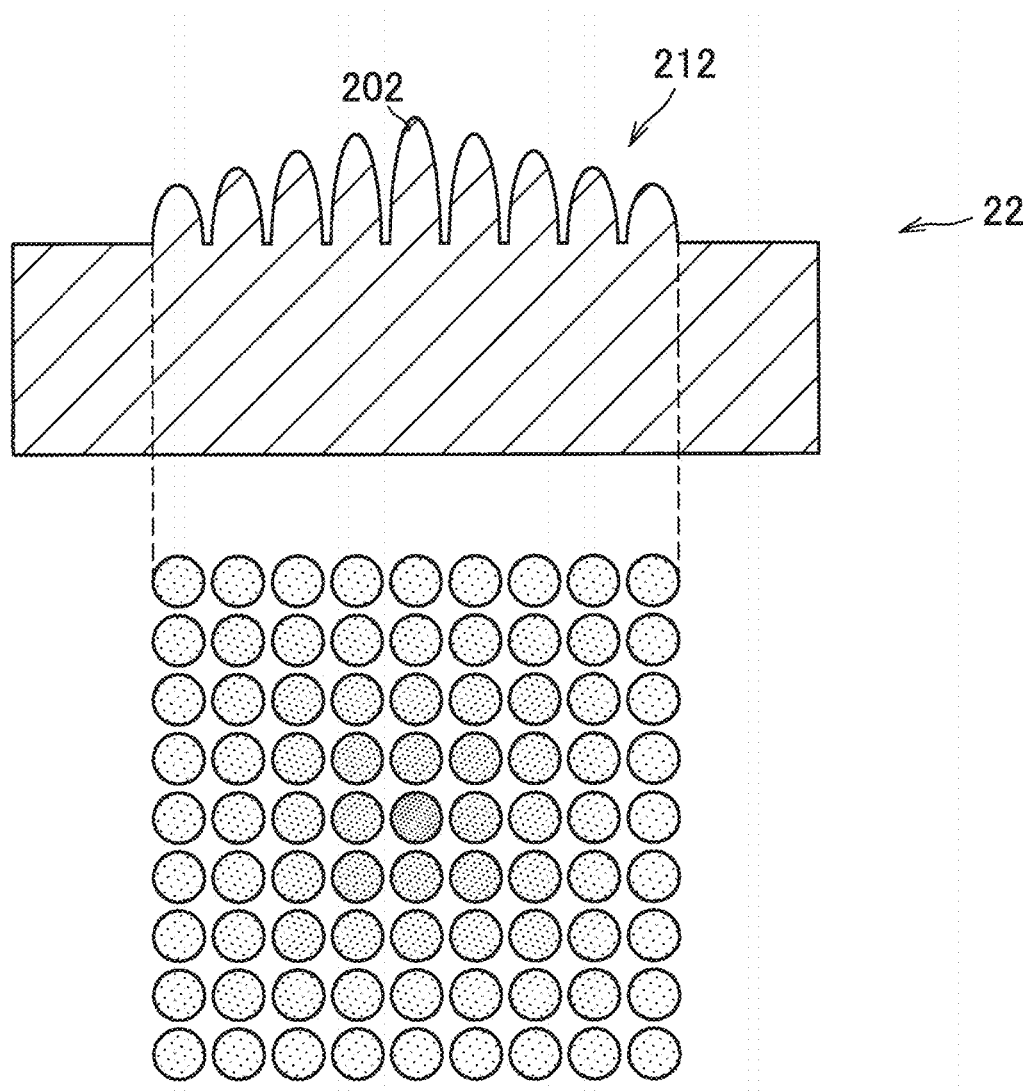
FIG. 5 includes a cross-sectional view and a plan view schematically showing another example of a transferred object obtained by transferring the concave-convex structure provided in the master.

As shown in FIG. 5, a concave-convex structure 22 may be structured such that convexity groups 212 (that is, concavity groups in the master 1), each including convexities 202 (that is, concavities in the master 1) laid out in the form of a rectangular lattice, are provided at a predetermined interval. In the concave-convex structure 22, the convexity group 212 is provided such that the heights of the convexities 202 in the convexity group 212 increase gradually toward the center of the convexity group 212. Therefore, in the concave-convex structure 22 shown in FIG. 5 may be formed as a structure presenting a convex lens-like shape as a whole. The transferred object including the concave-convex structure 22 can be used as a microlens array having an anti-reflection function by means of a moth-eye structure, for example.

Third Specific Example

Figure 6:
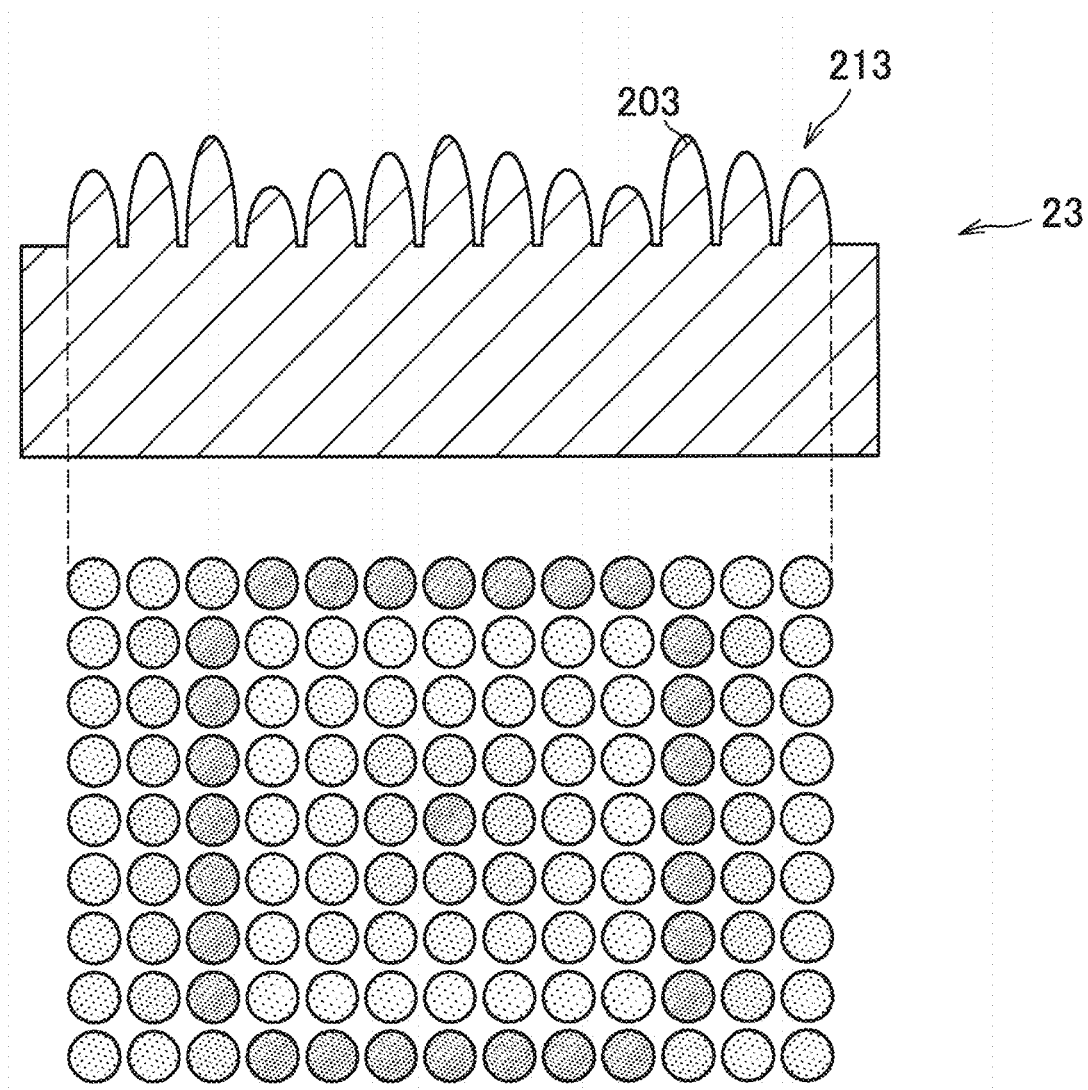
FIG. 6 includes a cross-sectional view and a plan view schematically showing another example of a transferred object obtained by transferring the concave-convex structure provided in the master.

As shown in FIG. 6, a concave-convex structure 23 may be structured such that convexity groups 213 (that is, concavity groups in the master 1), each including convexities 203 (that is, concavities in the master 1) laid out in the form of a rectangular lattice, are provided at a predetermined interval. In the concave-convex structure 23, the convexity group 213 is provided such that the heights of the convexities 203 in the convexity group 213 increase gradually toward the center of the convexity group 213, and provided in such a shape that the heights of the convexities 203 decrease concentrically so as to fall within a predetermined range. Therefore, in the concave-convex structure 23 shown in FIG. 6, the convexity groups 213 may be formed as a structure presenting a Fresnel lens-like shape as a whole. The transferred object including the concave-convex structure 23 can be used as a Fresnel lens array having an anti-reflection function by means of a moth-eye structure, for example.

Fourth Specific Example

Figure 7:
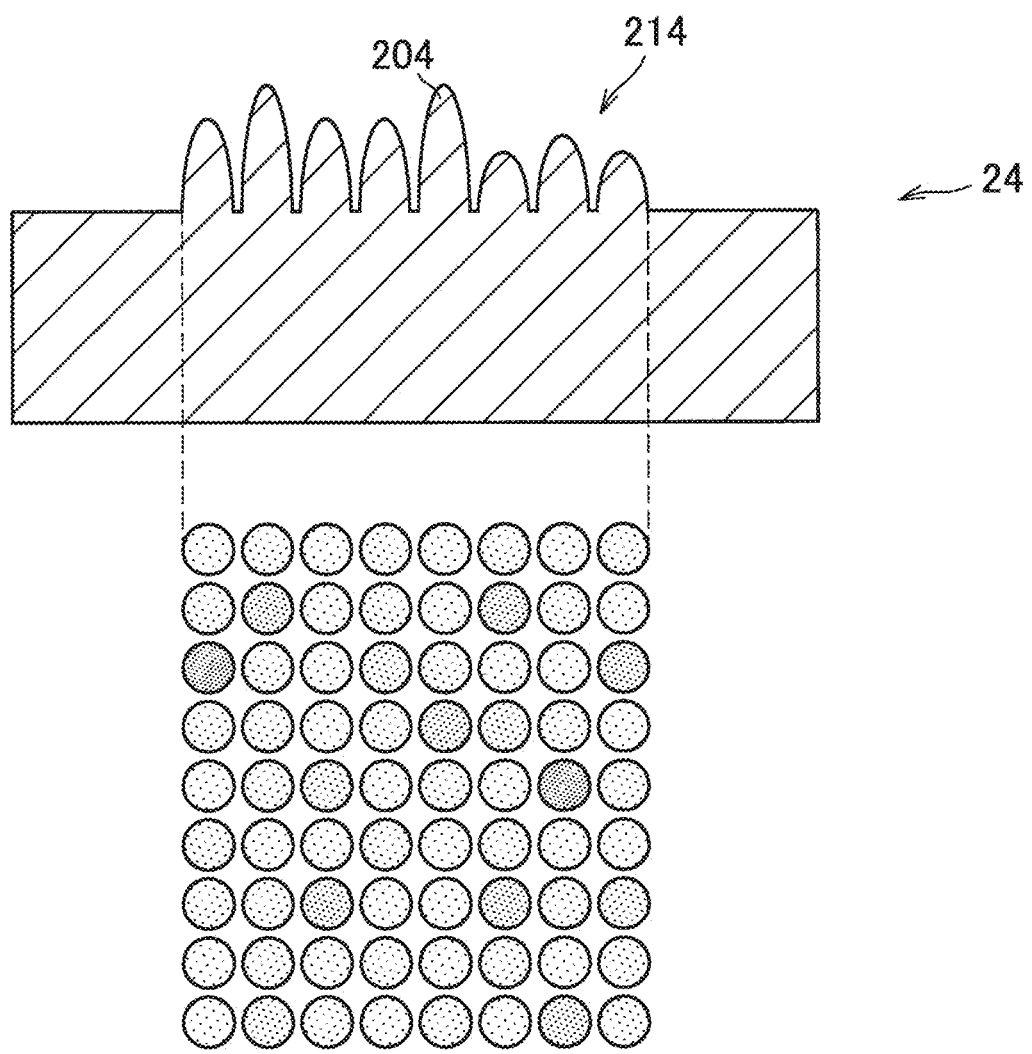
FIG. 7 includes a cross-sectional view and a plan view schematically showing another example of a transferred object obtained by transferring the concave-convex structure provided in the master.

As shown in FIG. 7, a concave-convex structure 24 may be structured such that convexity groups 214 (that is, concavity groups in the master 1), each including convexities 204 (that is, concavities in the master 1) laid out in the form of a rectangular lattice, are provided at a predetermined interval. In the concave-convex structure 24, the convexity group 214 is provided such that the heights of the convexities 204 in the convexity group 214 are irregular (random). However, more strictly saying, the convexities 204 having different heights are arranged irregularly (at random) in the convexity group 214 because the heights of the convexities 204 are provided to belong to any of a plurality of groups having different central values. Therefore, in the concave-convex structure 24 shown in FIG. 7, the convexity groups 214 may be formed as a moth-eye structure in which the heights of the convexities 204 are irregular as a whole. The transferred object including the concave-convex structure 24 can be used as an anti-reflection film or a light diffuser panel that produces less interfering light and diffracted light, for example.

Fifth Specific Example

Figure 8:
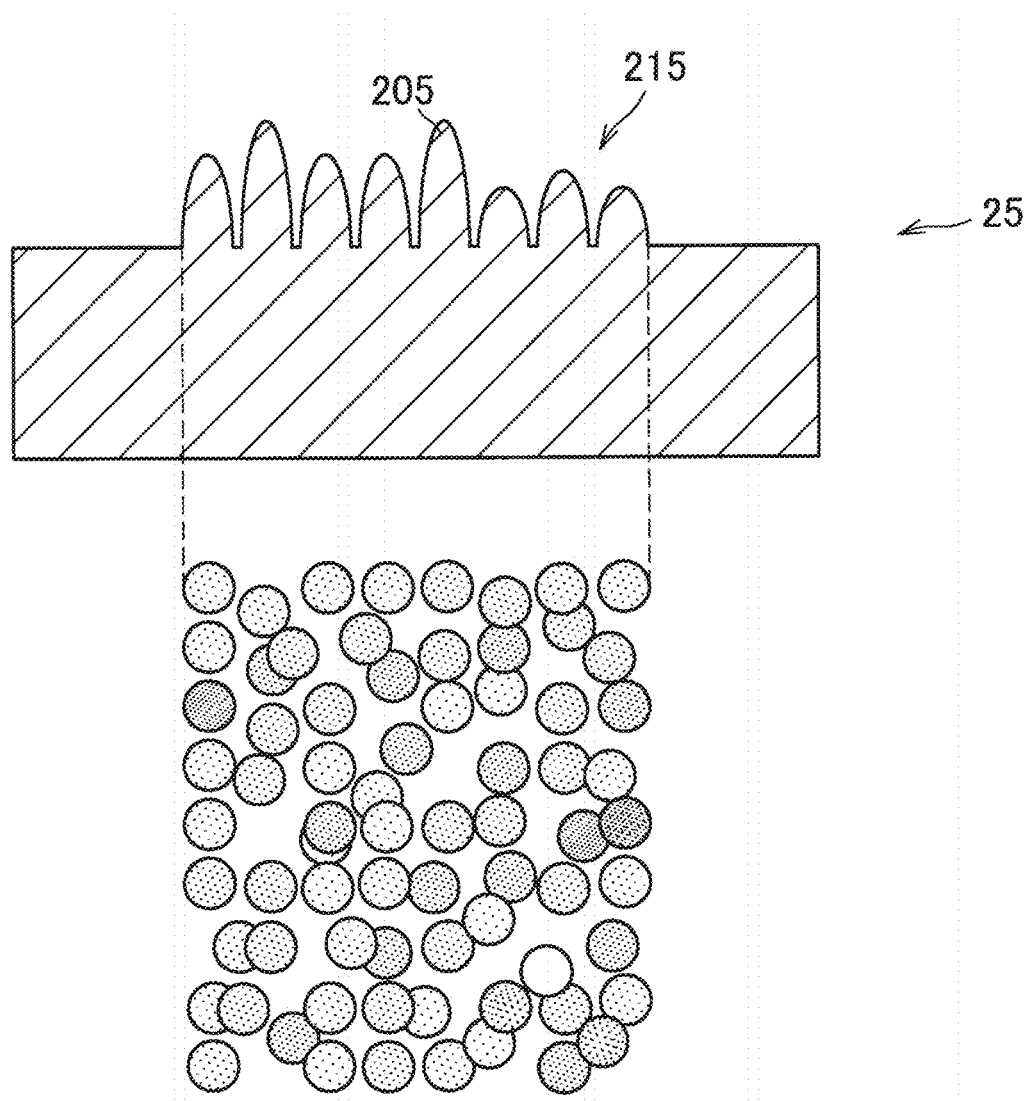
FIG. 8 includes a cross-sectional view and a plan view schematically showing another example of a transferred object obtained by transferring the concave-convex structure provided in the master.

As shown in FIG. 8, a concave-convex structure 25 may be structured such that convexity groups 215 (that is, concavity groups in the master 1), each including convexities 205 (that is, concavities in the master 1) laid out in an irregular (random) arrangement, are provided at a predetermined interval. In the concave-convex structure 25, the convexity group 215 is provided such that the convexities 205 having different heights are arranged irregularly (at random) in the convexity group 215, similarly to the concave-convex structure 24 shown in FIG. 8. Therefore, in the concave-convex structure 25 shown in FIG. 8, the convexity groups 215 may be formed as a moth-eye structure in which the heights and arrangement of the convexities 205 are irregular as a whole. The transferred object including the concave-convex structure 25 can be used as an anti-reflection film or a light diffuser panel that produces still less interfering light and diffracted light, for example. Note that the occurrence of unintended diffracted light or interfering light can be restrained further because the concave-convex structure 25 shown in FIG. 8 has a lower regularity than the concave-convex structure 24 shown in FIG. 7.

<4. Usage Example of Master>

Figure 9:
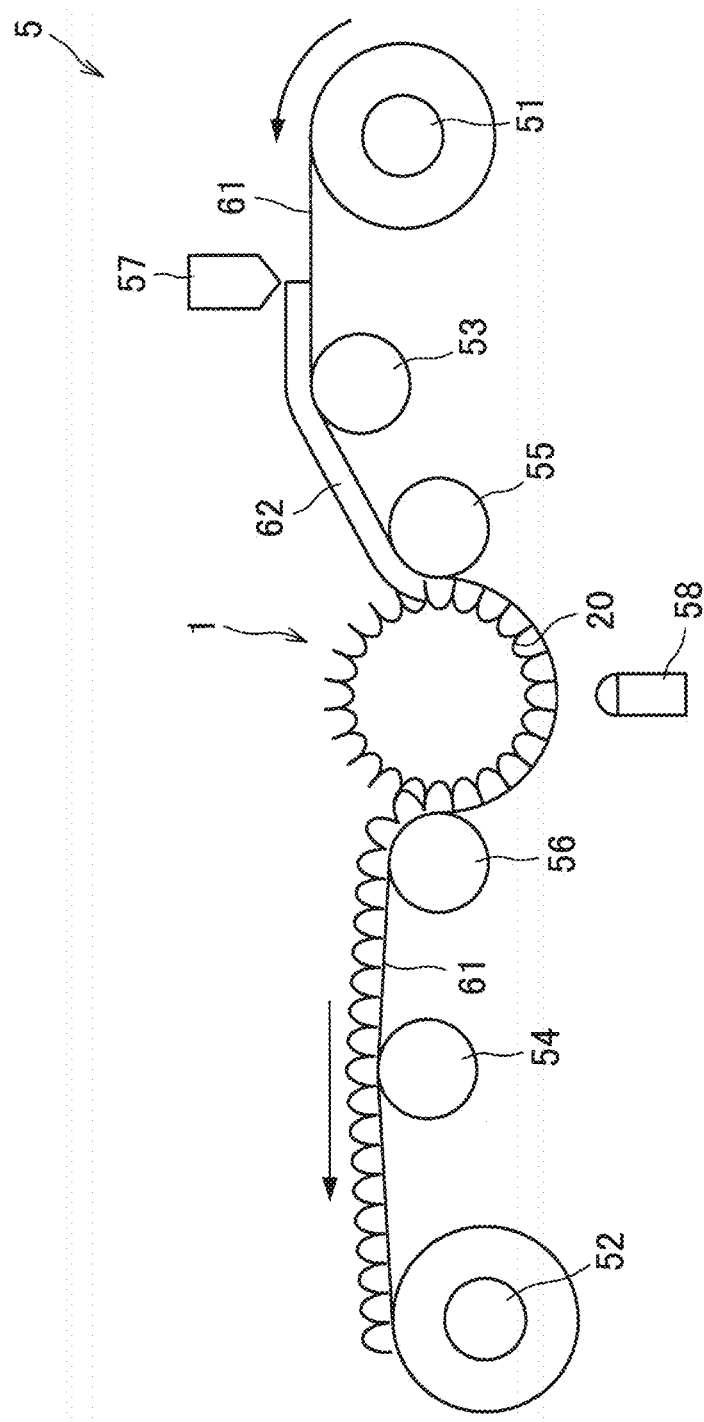
FIG. 9 is a schematic view showing a configuration of a transfer device that produces a transferred object using a master.

Subsequently, a usage example of the master 1 according to the present embodiment will be described with reference to FIG. 9. By using the master 1 according to the present embodiment, a transferred object obtained by transferring the concave-convex structure 20 of the master 1 can be produced. FIG. 9 is a schematic view showing a configuration of a transfer device 5 that produces a transferred object using the master 1 according to the present embodiment.

As shown in FIG. 9, the transfer device 5 includes the master 1, a base material feeding roll 51, a winding roll 52, guide rolls 53, 54, a nip roll 55, a separation roll 56, a coating device 57, and a light source 58. That is, the transfer device 5 shown in FIG. 9 is a roll-to-roll imprinting device.

The base material feeding roll 51 is, for example, a roll obtained by winding a sheet-like base material 61 into the form of a roll, and the winding roll 52 is a roll that winds up a transferred object on which a resin layer 62 to which the concave-convex structure 20 has been transferred is stacked. In addition, the guide rolls 53, 54 are rolls that convey the sheet-like base material 61 before and after transfer. The nip roll 55 is a roll that presses the sheet-like base material 61 on which the resin layer 62 has been stacked against the master 1, and the separation roll 56 is a roll that separates the sheet-like base material 61 on which the resin layer 62 has been stacked from the master 1 after transferring the concave-convex structure 20 to the resin layer 62.

The coating device 57 includes coating means such as a coater, and coats the sheet-like base material 61 with a light curing resin composition to form the resin layer 62. The coating device 57 may be, for example, a gravure coater, wire bar coater, die coater, or the like. In addition, the light source 58 is a light source that emits light having a wavelength that can cure the light curing resin composition, which may be an ultraviolet lamp or the like, for example.

Note that the light curing resin composition is resin that cures by being irradiated with light in a predetermined wavelength band. Specifically, the light curing resin composition may be ultraviolet curing resin such as acryl acrylate resin or epoxy acrylate resin. In addition, the light curing resin composition may contain a polymerization initiator, a filler, a functional additive, a solvent, an inorganic material, a pigment, an antistatic agent, a sensitizing dye, or the like according to necessity.

Note that the resin layer 62 may be made of a thermosetting resin composition. In such a case, the transfer device 5 is provided with a heater instead of the light source 58, and the resin layer 62 is heated with the heater to cure the resin layer 62, and the concave-convex structure 20 is transferred. The thermosetting resin composition may be phenol resin, epoxy resin, melamine resin, urea resin, or the like, for example.

In the transfer device 5, the sheet-like base material 61 is first delivered continuously from the base material feeding roll 51 via the guide roll 53. The delivered sheet-like base material 61 is coated with a light curing resin composition by the coating device 57, and the resin layer 62 is stacked on the sheet-like base material 61. In addition, the sheet-like base material 61 on which the resin layer 62 has been stacked is pressed against the master 1 by the nip roll 55. Accordingly, the concave-convex structure 20 formed in the outer peripheral surface of the master 1 is transferred to the resin layer 62. The resin layer 62 to which the concave-convex structure 20 has been transferred is cured by emission of light from the light source 58. Accordingly, an inverted structure of the concave-convex structure 20 is formed in the resin layer 62. The sheet-like base material 61 to which the concave-convex structure 20 has been transferred is separated from the master 1 by the separation roll 56, and delivered to the winding roll 52 via the guide roll 54 to be wound up.

With such a transfer device 5, the concave-convex structure 20 formed in the outer peripheral surface of the master 1 can be efficiently transferred to the sheet-like base material 61. Therefore, with the master 1 according to the present embodiment, the transferred object to which the concave-convex structure 20 has been transferred can be produced efficiently.

<5. Method of Producing Master>
(Overall Steps of Production Method)

Subsequently, a method of producing the master 1 according to the present embodiment will be described.

The master 1 according to the present embodiment can be produced by forming a resist pattern corresponding to the concave-convex structure 20 on the outer peripheral surface of the base material 10 using thermal lithography with laser light, and then etching the base material 10 using the resist pattern as a mask.

In the present embodiment, by arbitrarily controlling the intensity and emission timing of laser light used for thermal lithography, a more complicated concave-convex structure 20 can be formed. This is because laser light can be controlled in intensity and emission position with high accuracy by modulating a control signal. Therefore, the method of producing the master 1 according to the present embodiment enables the layout of the concavity groups 210 and the concavities 200 in the concave-convex structure 20 to be controlled with high accuracy and reproducibility.

Specifically, the method of producing the master 1 according to the present embodiment includes a deposition step of depositing a resist layer on the outer peripheral surface of the base material 10, an exposure step of emitting laser light to the resist layer to form a latent image, a development step of developing the resist layer on which the latent image has been formed to form a pattern on the resist layer, and an etching step of etching the base material 10 using the resist layer on which the pattern has been formed as a mask to form the concave-convex structure 20 in the outer peripheral surface of the base material 10.

In the deposition step, the resist layer is deposited on the outer peripheral surface of the base material 10. The resist layer is made of an inorganic material or organic material in which a latent image can be formed with laser light. As the inorganic material, a metal oxide containing one or two or more types of transition metals, such as tungsten (W) or molybdenum (Mo), for example, can be used. The inorganic material can be deposited as the resist layer by using a sputtering method or the like, for example. On the other hand, as the organic material, novolak-based resist, chemically amplified resist, or the like, for example, can be used. The organic material can be deposited as the resist layer by using a spin coating method or the like, for example.

In the exposure step, laser light is emitted to the resist layer formed on the outer peripheral surface of the base material 10 to form a latent image corresponding to the concave-convex structure 20 on the resist layer. The wavelength of laser light emitted to the resist layer is not particularly limited, but may be a wavelength belonging to a blue light band of 400 nm to 500 nm. In the exposure step, an output intensity and emission position of laser light are controlled by modifying a control signal for the laser light to be emitted to the outer peripheral surface of the base material 10, to control the sizes and positions of openings of the concavities 200 to be formed in the resist layer. Thus, the light source that emits laser light may be a semiconductor laser light source, output of which is easy to modify, for example. Note that an exposure device used in the exposure step will be described later.

In the development step, the resist layer on which the latent image has been formed through emission of laser light is developed to form a pattern corresponding to the latent image on the resist layer. For example, in the case where the resist layer is made of the above-described inorganic material, an alkaline solution such as an aqueous solution of tetramethylammonium hydroxide (TMAH) can be used for developing the resist layer. Alternatively, in the case where the resist layer is made of the above-described organic material, various organic solvents such as ester or alcohol can be used for developing the resist layer.

In the etching step, the base material 10 is etched using the resist layer on which the pattern has been formed as a mask to form the concave-convex structure 20 corresponding to the latent image in the outer peripheral surface of the base material 10. Etching of the base material 10 may be performed either by dry etching or wet etching. In the case where the base material 10 is made of a glass material consisting primarily of $SiO_2$ (for example, quartz glass or the like), etching of the base material 10 can be performed by dry etching through use of a fluorocarbon gas or wet etching through use of hydrofluoric acid or the like.

(Exposure Device)

Figure 10:
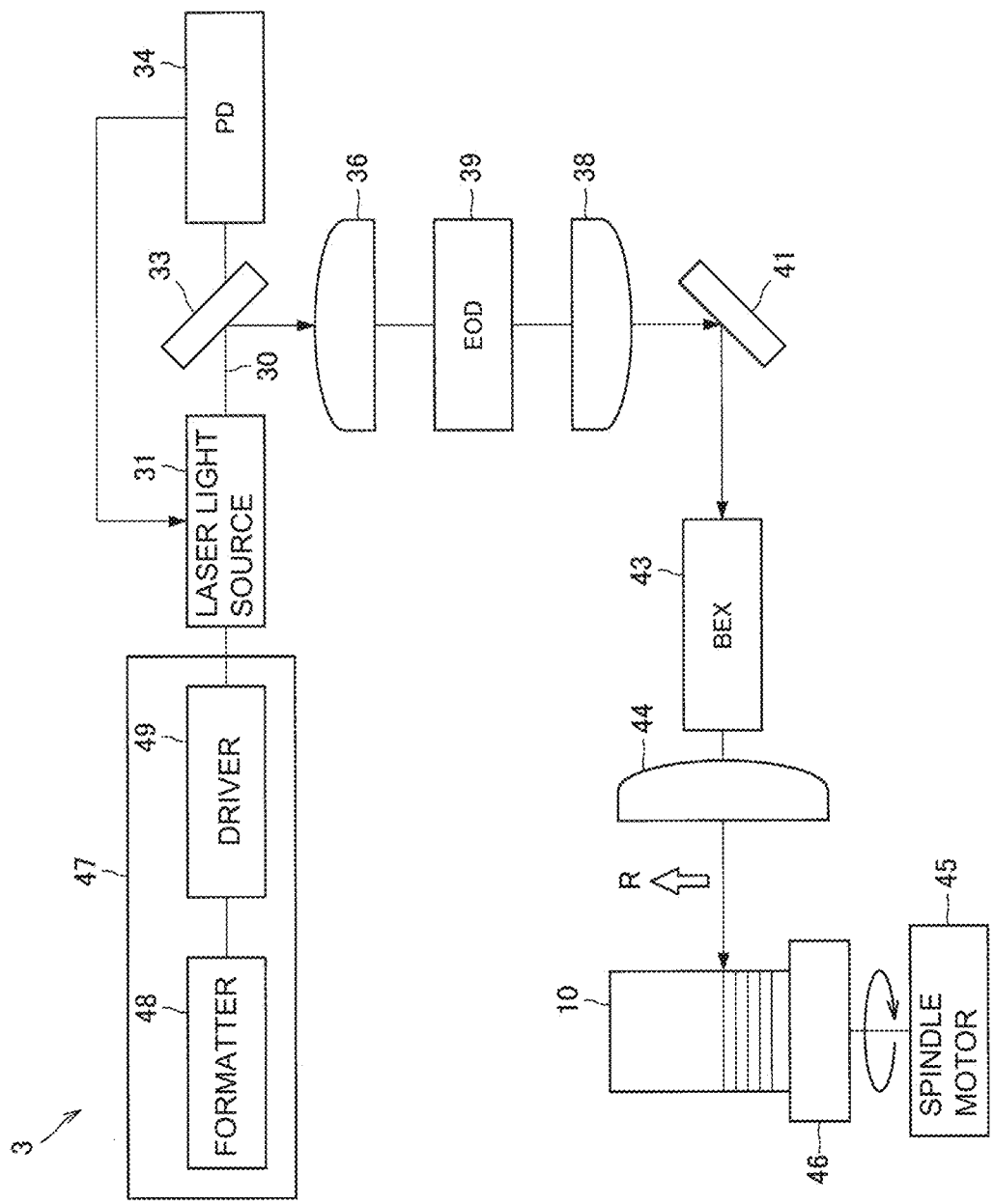
FIG. 10 is a block diagram describing a specific configuration of an exposure device for forming a concave-convex structure in a master.

Next, a specific configuration of an exposure device 3 that emits laser light to the base material 10 having a cylindrical shape or columnar shape in the above-described exposure step will be described with reference to FIG. 10. FIG. 10 is a block diagram describing the specific configuration of the exposure device 3.

As shown in FIG. 10, the exposure device 3 includes a laser light source 31, a first mirror 33, a photodiode (PD) 34, a condenser lens 36, an electro-optic deflector (EOD) 39, a collimator lens 38, a second mirror 41, a beam expander (BEX) 43, and an objective lens 44.

The laser light source 31 is controlled by an exposure signal generated by a control mechanism 47, and laser light 30 output from the laser light source 31 is emitted to the base material 10 placed on a turntable 46. In addition, the turntable 46 on which the base material 10 is placed is rotated by a spindle motor 45 controlled by a rotation control signal synchronized with the exposure signal.

The laser light source 31 is a light source that outputs the laser light 30 that exposes the resist layer deposited on the outer peripheral surface of the base material 10, as described above. The laser light source 31 may be a semiconductor laser light source that emits laser light having a wavelength belonging to the blue light band of 400 nm to 500 nm, for example. The laser light 30 output from the laser light source 31 travels straight as a parallel beam, and is reflected off the first mirror 33.

The laser light 30 reflected off the first mirror 33 is focused on the electro-optic deflector 39 by the condenser lens 36, and then changed to a parallel beam again by the collimator lens 38. The laser light 30 changed to a parallel beam is reflected off the second mirror 41 to be led to the beam expander 43 horizontally.

The first mirror 33 includes a polarization beam splitter, and has a function of reflecting one of polarization components and passing the other one of the polarization components. The polarization component having passed through the first mirror 33 is photoelectrically converted by the photodiode 34, and a photoelectrically converted light-receiving signal is input to the laser light source 31. Accordingly, the laser light source 31 can make an adjustment or the like on the output of the laser light 30 on the basis of feedback from the input light-receiving signal.

The electro-optic deflector 39 is an element capable of controlling the emission position of the laser light 30 by a distance on the order of nanometers. The exposure device 3 is capable of finely adjusting the emission position of the laser light 30 emitted to the base material 10 with the electro-optic deflector 39.

The beam expander 43 shapes the laser light 30 led by the second mirror 41 into a desired beam shape, and emits the laser light 30 to the resist layer formed on the outer peripheral surface of the base material 10 via the objective lens 44.

The turntable 46 supports the base material 10, and is rotated by the spindle motor 45 to rotate the base material 10. The turntable 46 can move the emission position of the laser light 30 in the axial direction of the base material 10 (that is, the direction of an arrow R) while rotating the base material 10. Accordingly, the outer peripheral surface of the base material 10 is exposed in a spiral manner. Note that the emission position of the laser light 30 may be moved by moving a laser head including the laser light source 31 along a slider.

The control mechanism 47 includes a formatter 48 and a driver 49, and controls the laser light source 31 to control the output intensity and emission position of the laser light 30.

The driver 49 controls output of the laser light source 31 on the basis of an exposure signal generated by the formatter 48. Specifically, the driver 49 may control the laser light source 31 such that the output intensity of the laser light 30 increases as the waveform amplitude of the exposure signal increases in magnitude. In addition, the driver 49 may control the emission position of the laser light 30 by controlling the timing of outputting the laser light 30 on the basis of the waveform shape of the exposure signal. As the output intensity of the laser light 30 increases, the size and depth of a latent image to be formed on the resist layer can be increased. Thus, the sizes and formed depths of openings to be finally formed in the base material 10 can be increased.

The spindle motor 45 rotates the turntable 46 on the basis of the rotation control signal. The spindle motor 45 may control rotation such that the turntable 46 rotates once in a case where a predetermined number of pulses are input by the rotation control signal. Note that the rotation control signal may be generated from a reference clock common to the exposure signal to be synchronized with the exposure signal.

With the exposure device 3 as described above, the laser light 30 can be emitted to the base material 10. This exposure device 3 enables a latent image with an arbitrary pattern to be formed on the outer peripheral surface of the base material 10 with high accuracy and high reproducibility.

The master 1 according to the present embodiment and the method of producing the master 1 have been described above in detail. Since the present embodiment enables the arrangement and formed depths of the concavities 200 to be controlled with higher accuracy and higher reproducibility, the master 1 including a more complicated concave-convex structure 20 can be provided.

EXAMPLES

Hereinafter, masters according to the present embodiment will be described further specifically with reference to examples and a comparative example. Note that the examples described below are conditional examples for presenting practicability and effects of the masters according to the present embodiment and a method of producing them, and the masters according to the present invention and the method of producing them are not limited to those of the following examples.

Example 1

A master according to Example 1 was fabricated through the following steps. First, a tungsten oxide was deposited to be a film thickness of 55 nm by sputtering on the outer peripheral surface of a base material (having an axial length of 100 mm, and a thickness of the outer peripheral surface of 4.5 mm) made of cylindrical quartz glass to form a resist layer. Next, thermal lithography was performed with laser light from a semiconductor laser light source having a wavelength of 405 nm using the exposure device shown in FIG. 10 to form a latent image on the resist layer. Note that the number of revolutions of the base material was set at 900 rpm.

Figure 11A:
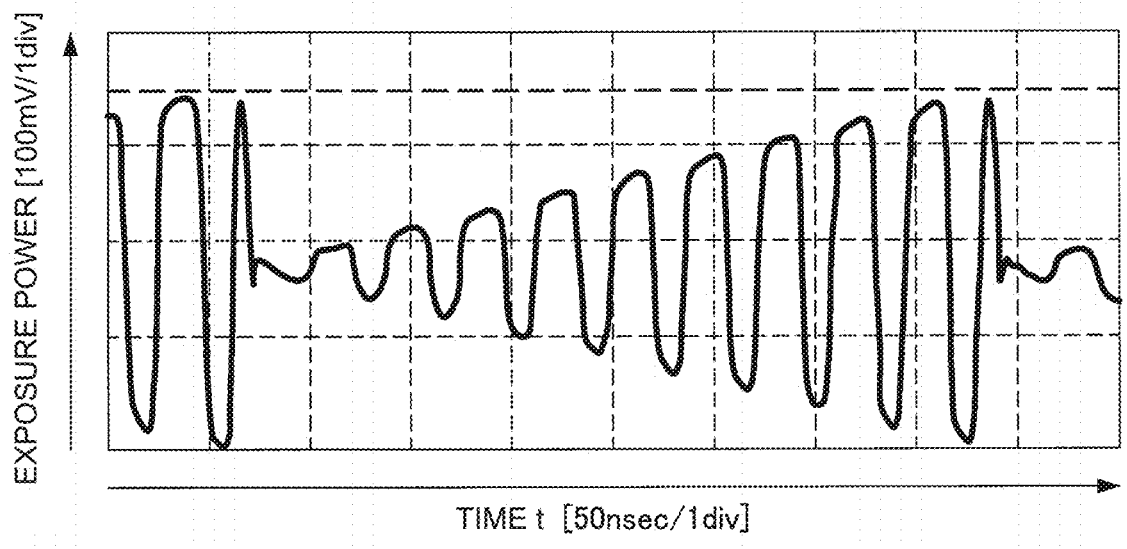
FIG. 11A is a graph showing a control signal for forming a single concavity group in a concave-convex structure of a master according to Example 1.

Herein, the control signal for controlling output of laser light was modified arbitrarily to form an arbitrary latent image on the resist layer. In Example 1, a control signal as shown in FIG. 11A was used as the control signal for controlling output of laser light. Specifically, as shown in FIG. 11A, output of the laser light was controlled using a control signal having a constant cycle and a gradually increasing amplitude. Note that the control signal shown in FIG. 11A presents a control signal for forming a single concavity group in the concave-convex structure of the master according to Example 1.

Subsequently, the base material after exposure was subject to development processing at 27 C.° for 900 seconds using a 2.38% by mass aqueous solution of tetramethylammonium hydroxide (TMAH) (available from TOKYO OHKA KOGYO CO., LTD.) to dissolve the resist layer at the latent image portion, and a concave-convex structure whose concavities have different formed depths and openings of different sizes was formed in the resist layer. Next, using the resist layer after development as a mask, reactive ion etching (RIE) was performed at a gas pressure of 0.5 Pa and input power of 150 W using $CHF_3$ gas (30 sccm) to etch the base material for 30 minutes. Thereafter, the remaining resist layer was removed.

The master having the concave-convex structure formed on the outer peripheral surface was fabricated through the above steps. Further, a transferred object was fabricated using the fabricated master. Specifically, the concave-convex structure formed on the outer peripheral surface of the master was transferred to ultra-violet curing resin using the transfer device shown in FIG. 9. Note that a polyethylene terephthalate (PET) film was used as a sheet-like base material of the transferred object, and the ultra-violet curing resin was cured by emitting ultra-violet rays of 1000 $mJ/cm^2$ for a minute with a metal halide lamp.

Example 2

Figure 11B:
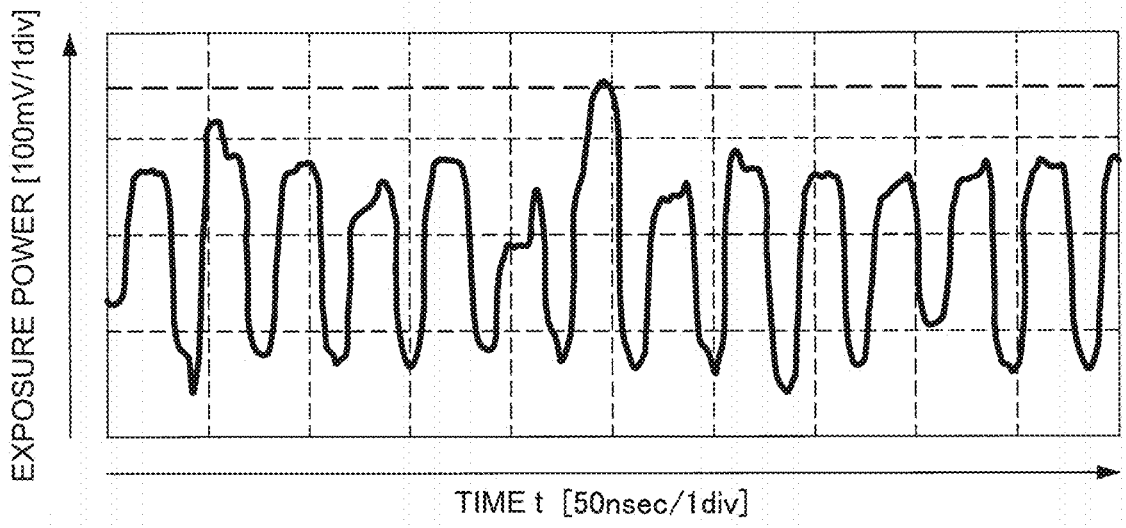
FIG. 11B is a graph showing a control signal for forming a concave-convex structure of a master according to Example 2.

A master according to Example 2 was fabricated using a method similar to that of Example 1, except using a control signal shown in FIG. 11B as the control signal for controlling output of laser light. Specifically, as shown in FIG. 11B, output of the laser light was controlled using a control signal having a constant cycle and an amplitude changing in magnitude irregularly (at random). Note that the control signal shown in FIG. 11B indicates a control signal for forming the concave-convex structure of the master according to Example 2. Furthermore, a transferred object was fabricated using the fabricated master by a method similar to that of Example 1.

(Evaluation Result)

Figure 12A:
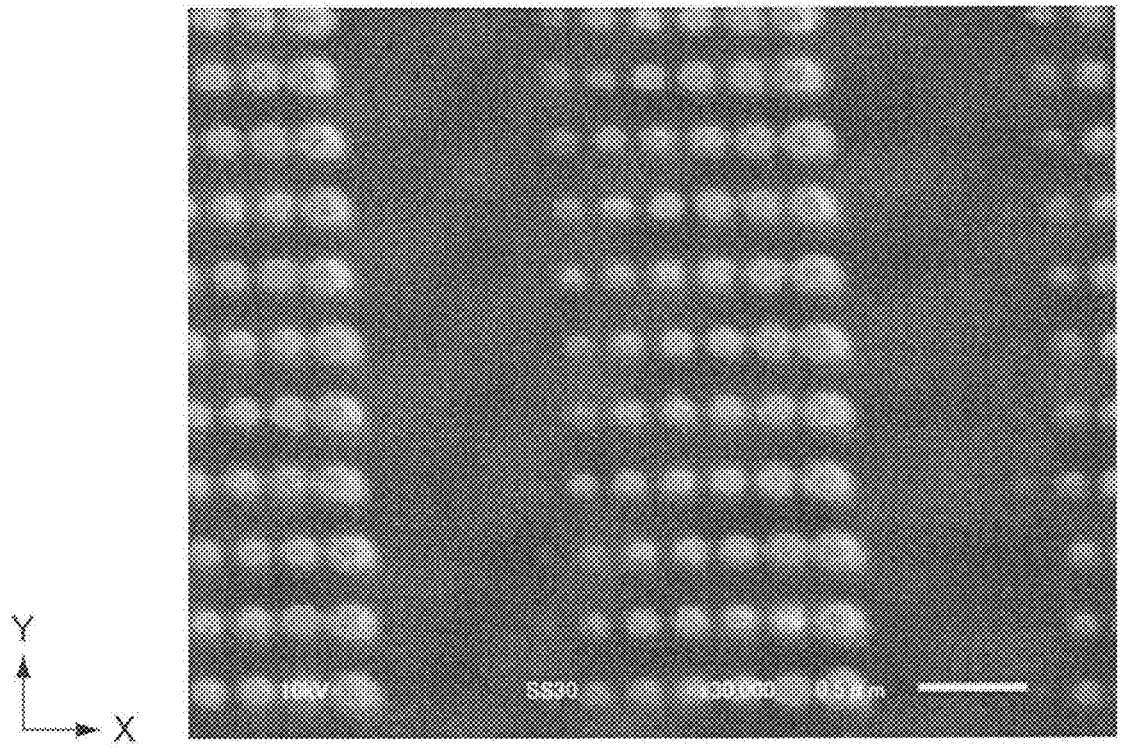
FIG. 12A shows an SEM image of a transferred object of the master according to Example 1 imaged at a magnification of 30,000×.
Figure 12B:
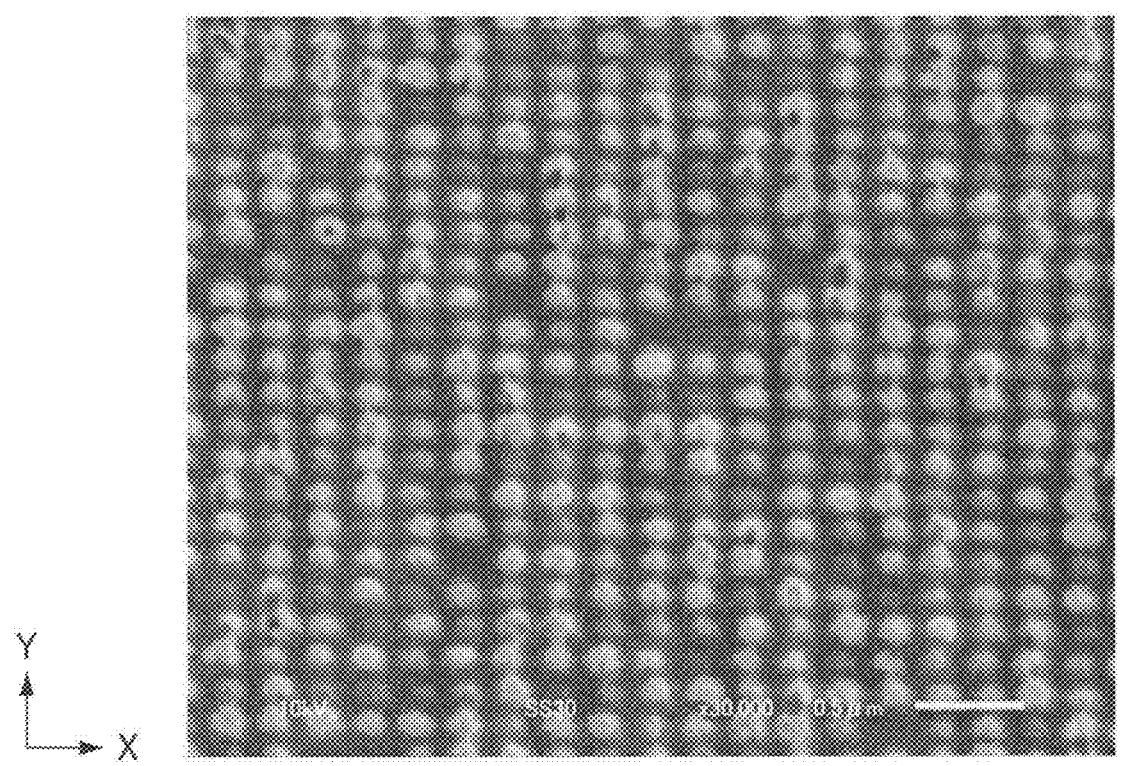
FIG. 12B shows an SEM image of a transferred object of the master according to Example 2 imaged at a magnification of 30,000×.
Figure 13A:
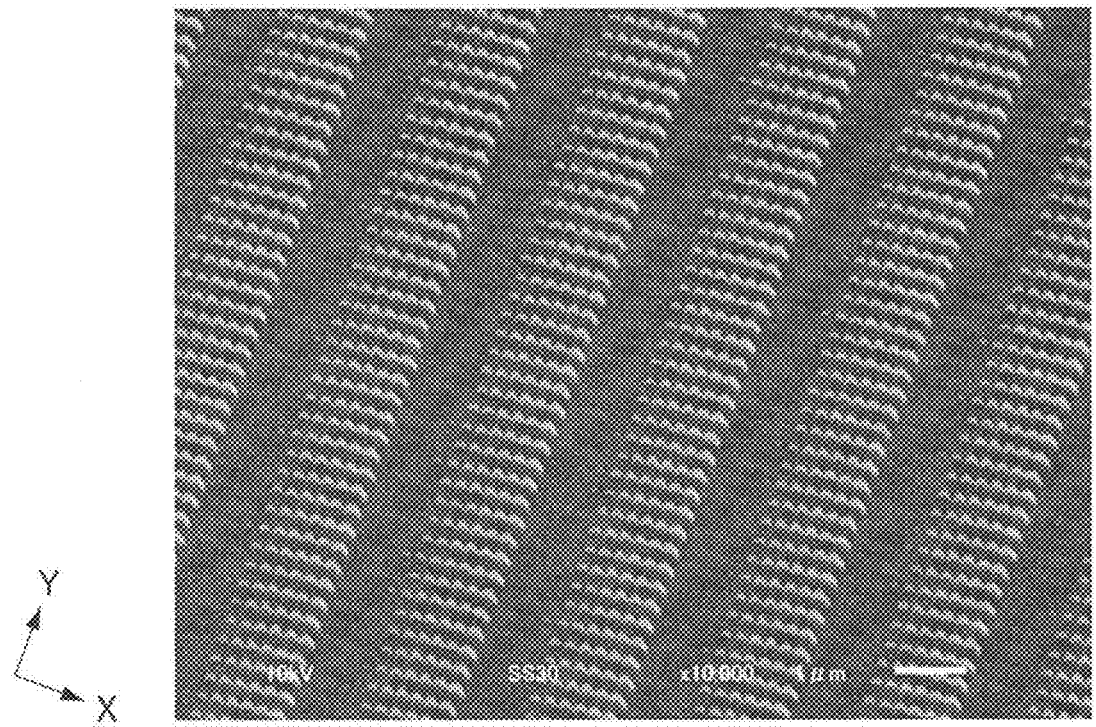
FIG. 13A shows an SEM image of the transferred object of the master according to Example 1 imaged at an inclination of 30° and a magnification of 10,000×.
Figure 13B:
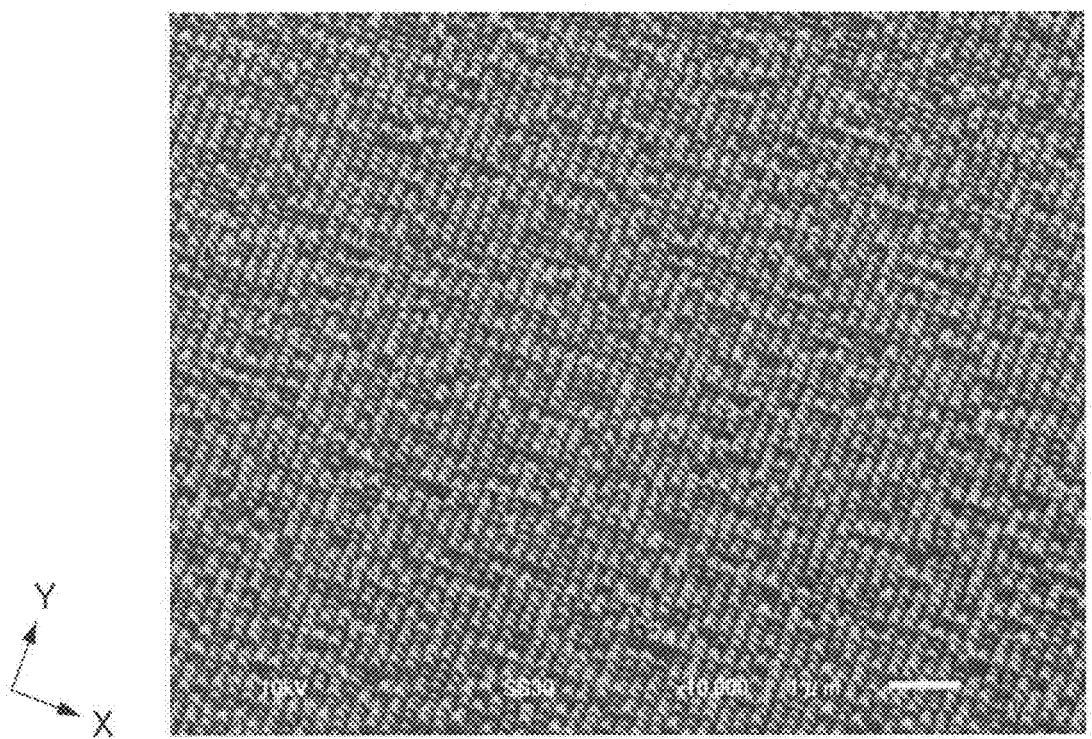
FIG. 13B shows an SEM image of the transferred object of the master according to Example 2 imaged at an inclination of 30° and a magnification of 10,000×.

Images of the transferred objects fabricated using the masters according to Example 1 and Example 2 and observed with a scanning electron microscope (SEM) are shown in FIG. 12A to FIG. 13B. FIG. 12A shows an SEM image of the transferred object of the master according to Example 1 imaged at a magnification of 30,000×, and FIG. 12B shows an SEM image of the transferred object of the master according to Example 2 imaged at a magnification of 30,000×. FIG. 13A shows an SEM image of the transferred object of the master according to Example 1 imaged at an inclination of 30° and a magnification of 10,000×, and FIG. 13B shows an SEM image of the transferred object of the master according to Example 2 imaged at an inclination of 30° and a magnification of 10,000×. Note that in FIG. 12A to FIG. 13B, the X direction corresponds to the peripheral direction of the base material, and the Y direction corresponds to the axial direction of the base material.

Referring to FIG. 12A and FIG. 13A, it is appreciated that convexities (that is, concavities in the master) having heights and widths gradually increasing in the peripheral direction of the base material are formed in the transferred object according to Example 1. It is also appreciated that a convexity group (that is, a concavity group in the master) is formed by a group of a plurality of convexities having heights and widths monotonously increasing on the master and the transferred object according to Example 1.

Referring to FIG. 12B and FIG. 13B, convexities (that is, concavities in the master) provided at regular intervals in the peripheral direction and axial direction of the base material and having different heights are formed on the transferred object according to Example 2. It is also appreciated that the heights of the convexities are changed irregularly (at random) on the master and the transferred object according to Example 2.

Note that, although not shown, the heights of the convexities of the transferred objects according to Example 1 and Example 2 (the depths of the concavities in the masters) were observed with an atomic force microscope (AFM) to find out that the heights of the respective convexities of the transferred objects according to Example 1 and Example 2 are divided into at least two or more groups having different central values.

As described above, since the present embodiment enables the arrangement and formed depths of concavities to be controlled with higher accuracy and higher reproducibility, a master including a more complicated concave-convex structure and a transferred object formed using the master can be provided.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, in the above embodiment, the concave-convex structure 20 includes the concavity groups 210 each including a group of the concavities 200, whilst the present invention is not limited to such an example. For example, the concave-convex structure 20 may include convexity groups each including a group of convexities protruding in the direction generally vertical to the outer peripheral surface of the base material 10, instead of the concavity groups 210.

REFERENCE SIGNS LIST 1 master
3 exposure device
5 transfer device
10 base material
20, 21, 22, 23, 24, 25 concave-convex structure
200 concavity
201, 202, 203, 204, 205 convexity
210 concavity group
211, 212, 213, 214, 215 convexity group
222 first concavity
224 second concavity
226 third concavity

The invention claimed is:
1. A master comprising:
a plurality of concave-convex groups provided on a base material spaced apart from each other, the concave-convex groups each including a plurality of concavities or convexities, wherein
average widths of areas occupied by the concavities or convexities at a surface of the base material are smaller than or equal to a wavelength belonging to a visible light band,
formed lengths of the concavities or convexities from the surface of the base material in each of the concave-convex groups each belong to any of at least two or more groups having different central values,
the concave-convex groups are spaced apart from each other such that concavities are not provided continuously, and are spaced apart from each other at an interval wider than an interval between the concavities or convexities within the concave-convex groups, and the respective concave-convex groups are laid out irregularly.

2. The master according to claim 1, wherein the average widths of the areas occupied by the respective concavities or convexities at the surface of the base material in each of the concave-convex groups belong to any of at least two or more groups having different central values.

3. The master according to claim 2, wherein the average widths of the areas occupied by the concavities or convexities at the surface of the base material increase as the formed lengths of the concavities or convexities at the surface of the base material increase.

4. The master according to claim 1, wherein the areas occupied by the respective concavities or convexities at the surface of the base material have a generally circular planar shape.

5. The master according to claim 1, wherein the interval at which each of the concave-convex groups is provided is larger than the wavelength belonging to a visible light band.

6. The master according to claim 1, wherein the respective concavities or convexities in each of the concave-convex groups are provided in a closest-packed arrangement.

7. The master according to claim 1, wherein the formed lengths of the respective concavities or convexities from the surface of the base material are changed gradually within each of the concave-convex groups.

8. The master according to claim 1, wherein the formed lengths of the respective concavities or convexities from the surface of the base material are changed irregularly within each of the concave-convex groups.

9. A master according to claim 1, wherein the concave-convex groups are spaced apart from each other at an interval larger than a wavelength of visible light.

10. A transferred object, comprising a concave-convex structure including the plurality of the concave-convex groups provided in the master as defined in claim 1 has been transferred.

11. A method of producing the master according to claim 1, comprising the steps of:
    forming a resist layer on a surface of the base material;
    emitting laser light to the resist layer from a laser light source while arbitrarily controlling an output intensity and emission timing of the laser light source;
    removing the resist layer in a region to which the laser light has been emitted or the laser light has not been emitted to form a pattern on the resist layer, the pattern including the plurality of concave-convex groups each including the plurality of concavities or convexities; and
    performing etching using the resist layer on which the pattern has been formed as a mask to form a concave-convex structure corresponding to the pattern in the surface of the base material.

12. The method of producing a master according to claim 11, wherein
    the base material has a columnar or cylindrical shape, and
    while rotating the base material using a height direction of the columnar or cylindrical shape as a rotation axis, the laser light source moves relatively in parallel to the rotation axis to emit the laser light to the resist layer on the base material.

13. The method of producing a master according to claim 12, wherein
    a control signal for the laser light source is generated to be synchronized with a control signal for rotation of the base material.

14. The method of producing a master according claim 11, wherein
    the laser light source is a semiconductor laser light source.

* * * * *